(12) United States Patent
Sasaki

(10) Patent No.: US 6,908,659 B2
(45) Date of Patent: *Jun. 21, 2005

(54) MAGNETIC RECORDING MEDIUM

(75) Inventor: Hideki Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/682,904

(22) Filed: Oct. 14, 2003

(65) Prior Publication Data

US 2004/0081857 A1 Apr. 29, 2004

Related U.S. Application Data

(63) Continuation of application No. 09/702,738, filed on Nov. 1, 2000, now Pat. No. 6,663,939.

(30) Foreign Application Priority Data

Nov. 2, 1999 (JP) ............................... 11-311733

(51) Int. Cl.$^7$ ............................................. G11B 5/706
(52) U.S. Cl. ........................ 428/141; 428/328; 428/336; 428/694 BA; 428/694 BS; 428/694 BC; 428/694 SG
(58) Field of Search ................................ 428/141, 328, 428/336, 694 BA, 694 BS, 694 BC, 694 SG

(56) References Cited

U.S. PATENT DOCUMENTS

| | | | |
|---|---|---|---|
| 5,215,804 A | * | 6/1993 | Hagens et al. .............. 428/156 |
| 5,443,913 A | | 8/1995 | Kohno et al. |
| 5,688,591 A | | 11/1997 | Kuwajima et al. |
| 5,863,647 A | * | 1/1999 | Yoneda et al. .............. 428/331 |
| 5,908,684 A | * | 6/1999 | Matsumura et al. ......... 428/141 |
| 5,922,454 A | | 7/1999 | Inaba et al. |
| 6,168,856 B1 | | 1/2001 | Sasaki et al. |
| 6,214,448 B1 | | 4/2001 | Sasaki et al. |

FOREIGN PATENT DOCUMENTS

| | | |
|---|---|---|
| EP | 0 717 396 | 6/1996 |
| EP | 0 732 688 | 9/1996 |
| EP | 0 817 176 | 1/1998 |
| EP | 0 945 857 | 9/1999 |
| JP | 10-302243 | 11/1998 |
| JP | 10-312525 | 11/1998 |

* cited by examiner

*Primary Examiner*—Stevan A. Resan
(74) *Attorney, Agent, or Firm*—Oblon, Spivak, McClelland, Maier & Neustadt, P.C.

(57) ABSTRACT

A magnetic recording medium for use in reproduction with an MR head, which comprises: a non-magnetic substrate; a non-magnetic layer including a binder resin having dispersed therein a non-magnetic powder on the non-magnetic substrate; and a magnetic layer on the non-magnetic layer, wherein the magnetic layer is obtained by applying a magnetic coating material on the applied, dried and cured non-magnetic layer, the magnetic layer includes a metal magnetic powder with a mean major axis length of from 0.03 to 0.08 $\mu$m, and a saturation magnetization $\sigma_s$ of from 100 to 130 Am$^2$/kg, and the center line mean roughness Ra of the magnetic layer surface is 5 nm or less.

7 Claims, No Drawings

MAGNETIC RECORDING MEDIUM

This is a continuation of application Ser. No. 09/702,738 filed Nov. 1, 2000, now U.S. Pat. No. 6,663,939 with a priority Japan 11-311733 filed Nov. 2, 1999.

BACKGROUND OF THE INVENTION

1. Field of the Invention

The present invention relates to a magnetic recording medium having a super thin film coating type magnetic layer. More particularly, it relates to a coating type magnetic recording medium adaptable to an MR (magnetic resistance) head.

2. Description of the Related Art

A magnetic recording system composed of a combination of an MR head and a coating type magnetic recording medium has come under review with a tendency toward higher density of a magnetic recording medium. For example, Japanese Patent Laid-Open Publication No.Hei 10-312525 discloses that by implementing a hexagonal ferrite powder-containing magnetic layer with a saturation magnetic flux density of from 300 to 1000 G, and a coercive force of 2000 Oe or more, or a ferromagnetic metal powder-containing magnetic layer with a saturation magnetic flux density of from 800 to 1500 G, and a coercive force of 2000 Oe or more, a magnetic recording medium excellent in cost efficiency, and ensuring a low noise and excellent in high density characteristics can be obtained. Further, Japanese Patent Laid-Open Publication No.Hei 10-302243 discloses that, by regulating the protrusion height on the magnetic layer surface and the magnetization reversal volume and by making a coercive force be 2000 Oe or more, a magnetic recording medium suitable for reproduction by an MR head and with improved durability and noise can be implemented.

On the other hand, for a method for coating a high density recording medium in recent years, Japanese Patent Publication No.Hei 05-059490 discloses a method in which a non-magnetic coating material is applied on a non-magnetic substrate, and a magnetic layer with a thickness of 1 $\mu$m or less is applied thereon while the non-magnetic coating material is still in a wet state.

However, the foregoing prior art methods are still insufficient for obtaining a low noise medium suitable for an MR head. For example, with the method in which a non-magnetic coating material is applied on a non-magnetic substrate, and a magnetic layer with a thickness of 1 $\mu$m or less is applied thereon while the non-magnetic coating material is still in a wet state as described in Japanese Patent Publication No.Hei 05-059490, the surface properties of the non-magnetic substrate directly affect the magnetic layer to cause noise degradation. Further, in actuality, a detailed description is not given to the relationship between the magnetic powder used and a noise in the prior art.

SUMMARY OF THE INVENTION

An object of the present invention is to provide a coating type magnetic recording medium which ensures a low noise, and is suitable for a system using an MR head.

The above-described object is achieved by the following aspects of the present invention.

According to the invention, there is the provision of a magnetic recording medium for use in reproduction with an MR head, comprising: a non-magnetic substrate; a non-magnetic layer including a binder resin, in which a non-magnetic powder is dispersed, on the non-magnetic substrate; and a magnetic layer on the non-magnetic layer, wherein the magnetic layer is obtained by applying a magnetic coating material on the applied, dried and cured non-magnetic layer, the magnetic layer includes a metal magnetic powder with a mean major axis length of from 0.03 to 0.08 $\mu$m, and a saturation magnetization $\sigma_s$ of from 100 to 130 Am$^2$/kg, and the center line mean roughness Ra of the magnetic layer surface is 5 $\mu$m or less.

Further, according to the invention, there is the provision of a magnetic recording reproduction system for recording onto a magnetic recording medium and reproducing with a MR, the magnetic recording medium comprising: a non-magnetic substrate; a non-magnetic layer including a binder resin, in which a non-magnetic powder is dispersed, on at least one side of the non-magnetic substrate; and a magnetic layer on the non-magnetic layer, wherein the magnetic layer includes a metal magnetic powder with a mean major axis length of from 0.03 to 0.08 $\mu$m, and a saturation magnetization $\sigma_s$ of from 100 to 130 Am$^2$/kg, and the center line mean roughness Ra of the magnetic layer surface is 5 nm or less.

DESCRIPTION OF THE PREFERRED EMBODIMENTS

Below, the specific structure of the present invention will be described in details.

In general, when an MR head is used as a reproducing head, the reproducing output obtainable is several times higher than a conventional magnetic head. On the other hand, a higher noise is also detected as compared with the magnetic head. Therefore, when the MR head is used, how to control the noise at a low level is a key factor.

In the present invention, as the magnetic powder, an acicular or a spindle-shaped metal magnetic powder is used. The metal magnetic powder is required to have a mean major axis length of from 0.03 to 0.08 $\mu$m, and more preferably from 0.04 to 0.07 $\mu$m for reducing a noise. If the mean major axis length is smaller than 0.03 $\mu$m, the metal magnetic powder is insufficiently dispersed. Consequently, the insufficient dispersion results in a large noise. On the other hand, if it exceeds 0.8 $\mu$m, a magnetic noise is increased due to the large size of the magnetic powder.

Further, the saturation magnetization $\sigma_s$ of the metal magnetic powder used is from 100 to 130 Am$^2$/kg, and more preferably from 110 to 125 Am$^2$/kg. If it is smaller than 100, the output power becomes insufficient. In contrast, if it is larger than 130, the output power is sufficient. However, the magnetic noise is also accordingly increased, resulting in a disadvantageous condition for reproduction with an MR head. Further, magnetic flocculation in the magnetic coating material increases with an increase in $\sigma_s$. As a result, there occur problems that the coating properties are aggravated, and the magnetic powder becomes difficult to be oriented. Further, by setting the X-ray crystal particle size Dx of the metal magnetic powder at from 50 to 150 Å, and preferably at 50 to 120 Å, the magnetic noise can be effectively reduced. Still further, by setting $\sigma_s$ (Am$^2$/kg)/Dx(Å) at 0.9 or less, preferably at 0.8 or less, and more preferably at 0.7 or less, the balance between the magnetic noise and the output power can be optimized with ease.

Such a metal magnetic powder preferably contains a magnetic metallic element such as $\alpha$-Fe, Fe—Co, Fe—Co—Ni, Co, or Co—Ni as a main component, and contains preferably 70 wt % or more, and preferably 75 wt % or more of a metal (Fe, Co, Ni, or the like), or an alloy in the magnetic powder.

For reducing a noise, it is important for the metal magnetic powder to have no branching, and extremely less lattice defects and pores on the magnetic powder surface, and has a uniform particle size.

Such a magnetic powder can be obtained in the following manner.

With a first method, to an aqueous solution of a ferrous salt such as iron chloride or iron sulfate, added is an alkali such as cobalt chloride or sodium hydroxide for neutralization. The solution is heated while blowing an oxidizing gas therein to effect the oxidization reaction, resulting in the formation of an acicular goethite ($\alpha$-FeOOH). The resulting goethite is heat-treated in a non-reducing atmosphere to be dehydrated, resulting in the formation of $\alpha$-$Fe_2O_3$. Subsequently, the resulting $\alpha$-$Fe_2O_3$ is reduced while blowing a hydrogen gas therein to obtain a metal magnetic powder. In this manufacturing method, by setting the amount of alkali to be two or more times, and preferably from 3 to 10 times the neutralization equivalent, the resulting goethite has less branching. Further, addition of Al or Si therein during the goethite-yielding reaction can prevent the goethite from sintering due to heat and thus control the shape, and hence it is preferable. The addition of Si is also effective for improving the coercive force. Whereas, when the heat-treatment temperature in the dehydration process of the goethite is set to be from 400 to 700° C., the resulting $\alpha$-$Fe_2O_3$ has less voids, and less unevenness on the magnetic powder surface, resulting in a noise reduction. Further, addition of Y and rare earth elements such as Nd and Sm can smooth the surface of the resulting metal magnetic powder. Consequently, the resulting magnetic coating material is excellent in dispersibility when being prepared as a magnetic coating material, as well as the resulting coating film also has a very smooth magnetic layer surface.

Secondly, the metal magnetic powder can also be obtained in the following manner. An aqueous ferrous salt solution is neutralized by alkali carbonate to form $FeCO_3$, and an oxidizing gas is blown thereinto to obtain spindle-shaped goethite. Thereafter, the resulting goethite is subjected to the same processes as described above. In this case, the metal magnetic powder of the present invention can also be obtained by conducting the foregoing control. Further, in the metal magnetic powder containing Fe as a main component, and further containing at least Co, the amount of Co atoms is from 0 to 40 mol %, and preferably from 6 to 35 mol % based on the amount of Fe atoms.

Further, for achieving the saturation magnetization of the present invention, preferably, an oxide film is formed on the metal magnetic powder surface, the surface is partially subjected to a carbonizing or nitriding treatment, or a carbonaceous film is formed on the surface. A hydroxide or an oxide may also be contained in a small amount.

The content of the metal magnetic powder in the magnetic layer is from 50 to 85 wt %, and preferably from 55 to 75 wt % based on the total amount. The magnetic layer may contain, in addition to the foregoing metal magnetic powders, carbon black, abrasive materials such as $\alpha$-alumina, $\beta$-alumina, $\gamma$-alumina, dichromium trioxide, $\alpha$-iron oxide, $\gamma$-iron oxide, goethite, $SiO_2$, ZnO, $TiO_2$, $ZrO_2$, and $SnO_2$, and further lubricants such as higher fatty acids, higher fatty acid esters, praffin, and fatty amide.

Further, in the present invention, the center line surface roughness Ra of the magnetic layer surface is required to be 5 nm or less, and preferably 4.5 nm or less. If Ra exceeds 5 nm, the noise component is increased, causing a problem of deterioration in S/N ratio.

The particle size of the abrasive material herein used preferably satisfies the relationship of $0.5 \times T \leq D \leq 1.5 \times T$, where the thickness of the magnetic layer is T, and the average particle size of the abrasive material is D. If it is less than $0.5 \times T$, the magnetic layer lacks in abrasive power, resulting in a deterioration in durability. On the other hand, if it exceeds $1.5 \times T$, the abrasive material falls off therefrom to mar the magnetic layer, or the abrasive material exposing itself on the magnetic layer comes in contact with an MR head portion, thereby causing the occurrence of a thermal noise.

The binder for use in the magnetic layer of the present invention may be a thermoplastic resin, a thermosetting or reactive resin, an electron beam sensitive modified resin, or the like. The combination thereof is appropriately selected for use in accordance with the characteristics of the medium, and the process conditions.

The coating film of the present invention is so configured that a non-magnetic layer is interposed between the non-magnetic substrate and the magnetic layer. The provision of the non-magnetic layer therebetween can lessen the roughness of the non-magnetic substrate to obtain a magnetic layer with excellent surface properties. Further, the inclusion of a lubricant in the non-magnetic layer enables gradual supply of the lubricant from the non-magnetic layer to the magnetic layer. As a result, a magnetic recording medium with a good durability can be obtained.

For this reason, the non-magnetic layer desirably contains carbon black. The inclusion of carbon black therein allows the non-magnetic layer to hold the lubricant in large amounts. Further, it also contributes to a reduction in surface electric resistance of the magnetic layer. Still other non-magnetic powders than this carbon can also be additionally used. Non-exclusive examples thereof include $\alpha$-$Fe_2O_3$, $\alpha$-$Al_2O_3$, $Cr_2O_3$, $SiO_2$, ZnO, $TiO_2$, $ZrO_2$, and $SnO_2$. Out of these, if an acicular $\alpha$-$Fe_2O_3$ with a mean major axis length of 200 nm or less or a particulate $\alpha$-$Fe_2O_3$ with a particle size of from 20 to 100 nm is additionally used, the thixotropic properties of the coating material can be reduced as compared with a coating material containing only carbon black, and the film can also be made hard. Further, additional use of $\alpha$-$Al_2O_3$ or $Cr_2O_3$ with a mean particle size of from 0.1 to 1.0 $\mu$m as the abrasive material leads to an increase in strength of the non-magnetic layer.

The proportion of carbon black in the non-magnetic powders is from 5 wt % to 100 wt %, preferably from 10 to 100 wt %. If it is less than 5 wt %, the capability for holding the lubricant to be added is deteriorated, and hence the durability is deteriorated. Further, the surface electric resistance of the magnetic layer is increased, or the light transmittance is increased. Although the carbon black to be used has no particular restriction, it preferably has a mean particles size of from 10 nm to 80 nm. Such carbon black to be used can be selected from furnace carbon black, thermal carbon black, acetylene carbon black, and the like, and it may be of a single system or mixed system.

About the carbon black which can be used in the present invention, the descriptions in, for example, "Handbook of Carbon Black" edited by Carbon Black Society can be referred to.

The resin for use in the lower layer coating material is desirably an electron beam-curable resin. Use of a thermosetting resin requires a heat-curing process after coating of the non-magnetic layer, which undesirably causes deformation of the coated non-magnetic substrate, and the like, due to heat-curing. Whereas, if the thermosetting resin is used without being heat-cured, upon applying a magnetic coating material thereon, a solvent permeates into the non-magnetic layer to cause swelling, or the non-magnetic layer dissolves, thereby undesirably deteriorating the surface properties of the magnetic layer.

Examples of the electron beam-curable resin to be used in the present invention include a large number of resins such as vinyl chloride series resins, polyurethane resins, polyester resins, epoxy series resins, phenoxy resins, fibrous resins, polyether series resins, polyvinyl alcohol series resins. Out of these, vinyl chloride series resins and polyurethane resins are typical examples, and both of them are preferably mixed to be used.

The electron beam-curable vinyl chloride series resins can be synthesized by subjecting vinyl chloride series resins as starting materials to electron beam sensitive modification. The vinyl chloride series resin as the starting material has a vinyl chloride content of from 60 to 100 wt %, and in particular preferably from 60 to 96 wt %. Examples of such vinyl chloride series resins include vinyl chloride-vinyl acetate-vinyl alcohol copolymers, vinyl chloride-hydroxyalkyl (meth)acrylate copolymers, vinyl chloride-vinyl acetate-maleic acid copolymers, vinyl chloride-vinyl acetate-vinyl alcohol-maleic acid copolymers, vinyl chloride-hydroxyalkyl (meth)acrylate-maleic acid copolymers, vinyl chloride-vinyl acetate-vinyl alcohol-glycidyl (meth)acrylate copolymers, vinyl chloride-hydroxyalkyl (meth)acrylate-glycidyl (meth)acrylate copolymers, vinyl chloride-hydroxyalkyl (meth)acrylate-allyl glycidyl ether copolymers, and vinyl-chloride-vinyl acetate-vinyl alcohol-allyl glycidyl ether copolymers. In particular, copolymers of vinyl chloride and monomers containing epoxy(glycidyl) groups are preferred. The mean polymerization degree thereof is preferably from 100 to 900, and more preferably from 100 to 600.

Further, for enhancing the dispersibility, if required, polar groups such as $-SO_4Y$, $-SO_3Y$, $-POY$, $-PO_2Y$, $-PO_3Y$, and $-COOY$ (where Y is hydrogen or an alkali metal), $-SR$, $NR_2$, and $NR_3^+Cl^-$ (where R is hydrogen or hydrocarbon), phosphobetaine, sulfobetaine, phosphamine and sulfamine are preferably introduced therein with a given method. Further, an epoxy group is also preferably introduced therein for enhancing the thermal stability.

Typical examples of the method for subjecting the vinyl chloride series resins to electron beam sensitive modification include: a method in which a compound having a (meth) acryl group, and a carboxylic acid anhydride or a dicarboxylic acid is allowed to react with a resin having a hydroxyl group or a carboxyl group for modification; a method in which a reaction product (adduct) of TDI (tolylene diisocyanate) and 2-HEMA (hexaethylene methacrylate) is allowed to react with the resin for modification; and a method in which monomers each having one or more ethylenic unsaturated double bond and one isocyanate group in one molecule, and having no urethane bond in the molecule is allowed to react with the resin. Out of these, the third method is excellent in terms of ease of modification, and the dispersibility and physical properties after modification, and hence modification is preferably accomplished with the third method. As such a monomer, mention may be made of 2-isocyanate ethyl(meth)acrylate, and the like. The number of the acryl groups or methacryl groups in the molecule is preferably from 1 to 20, and more preferably from 2 to 15 on an average.

The electron beam-curable polyurethane resin is an urethane resin having at least one acrylic bond in the molecule, that is, a polyurethane acrylate compound bonded with an acrylic double bond-containing compound through an urethane bond.

The term "acrylic double bond" herein used denotes the residue (an acryloyl group or methacryloyl group) of acrylic acid, acrylic acid ester, acrylic acid amide, methacrylic acid, methacrylic acid ester, methacrylic acid amide, and the like. Preferred examples of the acrylic double bond-containing compound include mono(meth)acrylates of glycols such as ethylene glycol, diethylene glycol, and hexamethylene glycol; mono(meth)acrylates and di(meth)acrylates of triol compounds such as trimethylol propane, glycerine, and trimethylol ethane; mono(meth)acrylates, di(meth)acrylates, and tri(meth)acrylates of tetrahydric or higher polyols such as pentaerythritol, and dipentaerythritol; and hydroxyl group-containing acrylic compounds such as glycerin monoallyl ether and glycerin diallyl ether. At least one, preferably from 2 to 20 such acrylic double bonds is required to be present in a binder molecule.

The polyurethane acrylate resins are generally obtained by reacting a hydroxyl group-containing resin, and a hydroxyl group-containing acrylic compound with a polyisocyanate-containing compound. Examples of the hydroxyl group-containing resin include polyalkylene glycols such as polyethylene glycol, polybutylene glycol, and polypropylene glycol, alkylene oxide adducts of bisphenol-A, various glycols, and polyester polyols having a hydroxyl group at the end of a molecular chain. Preferred among these are polyurethane acrylate resins obtained from polyester polyols as one component.

The carboxylic acid components of the polyester polyols include aromatic dicarboxylic acids such as terephthalic acid, isophthalic acid, ortho-phthalic acid, and 1,5-naphthalic acid; aromatic oxycarboxylic acids such as p-oxybenzoic acid and p-(hydroxyethoxy)benzoic acid; aliphatic dicarboxylic acids such as succinic acid, adipic acid, azelaic acid, sebasic acid, and dodecanedicarboxylic acid; unsaturated fatty acids and alicyclic dicarboxylic acids such as fumaric acid, maleic acid, itaconic acid, tetrahydrophthalic acid, and hexahydrophthalic acid; and tri- and tetracarboxylic acids such as trimellitic acid, trimesic acid, and pyromellitic acid.

Also, the glycol components of the polyester polyols include ethylene glycol, propylene glycol, 1,3-propane diol, 1,4-butane diol, 1,5-pentane diol, 1,6-hexane diol, neopentyl glycol, diethylene glycol, dipropylene glycol, 2,2,4-trimethyl-1,3-pentane diol, 1,4-cyclohexane dimethanol, ethylene oxide adducts and propylene oxide adducts of bisphenol-A or the like, ethylene oxide adducts and propylene oxide adducts of hydrogenated bisphenol-A, polyethylene glycol, polypropylene glycol, and polytetramethylene glycol. Tri- and tetra-ols such as trimethylol ethane, trimethylol propane, glycerin, and pentaerythritol may be additionally used. Other useful polyester polyols are lactone series polyester diol chains obtained by ring-opening polymerization of lactones such as caprolactone.

Examples of the polyisocyanate used herein include diisocyanate compounds such as 2,4-tolylene diisocyanate, 2,6-tolylene diisocyanate, p-phenylene diisocyanate, biphenylmethane diisocyanate, m-phenylene diisocyanate, hexamethylene diisocyanate, tetramethylene diisocyanate, 3,3'-dimethoxy-4,4'-biphenylene diisocyanate, 2,4-naphthalene diisocyanate, 3,3'-dimethyl-4,4'-biphenylene diisocyanate, 4,4'-diphenylene diisocyanate, 4,4'-diisocyanate diphenyl ether, 1,5-naphthalene diisocyanate, p-xylylene diisocyanate, m-xylylene diisocyanate, 1,3- diisocyanatomethylcyclohexane, 1,4-diisocyanatomethyl-cyclohexane, 4,4'-diisocyanatedicyclohexane, 4,4'-diisocyanatocyclohexylmethane, and isophorone diisocyanate, or less than or equal to 7 mol % based on the entire isocyanato group of triisocyanate compounds such as 2,4-tolylene diisocyanate trimers and hexamethylene diisocyanate trimers.

Further, for enhancing the dispersibility, if required, polar groups such as —SO$_4$Y, —SO$_3$Y, —POY, —PO$_2$Y, —PO$_3$Y, and —COOY (where Y is hydrogen or an alkali metal), —SR, NR$_2$, and NR$_3$$^+$Cl$^-$ (where R is hydrogen or hydrocarbon), phosphobetaine, sulfobetaine, phosphamine and sulfamine are preferably introduced with a given method. Further, an epoxy group is also preferably introduced for enhancing the thermal stability.

On the other hand, electron beam modification can also be accomplished by using a thermosetting polyurethane resin as a starting material by the same method as with a vinyl chloride series resin aside from the electron beam curable urethane synthesis method.

Further, if required, an electron beam-curable monomer or oligomer can also be used. Use thereof can raise the degree of crosslinking of the coating film. The amount of the monomer or oligomer to be added is preferably 30 parts by weight or less, and more preferably 20 parts by weight or less based on the amount of the resin contained in the non-magnetic layer. If it exceeds 30 parts by weight, a shock inflicted on the coating material is large, causing a reduction in gloss. The electron beam-curable monomer or oligomer may be added either after formation of the coating material or during dispersion.

The irradiation dose of the electron beam to be used in the present invention may be from 1 to 10 Mrad, and preferably from 3 to 7 Mrad. The irradiation energy (acceleration voltage) thereof may be preferably 100 kV or more. Electron beam is desirably irradiated after coating and drying, and prior to winding into a roll, but irradiation after winding is also acceptable.

The center line mean roughness Ra of the non-magnetic substrate on the side to be provided with a magnetic layer of the present invention is preferably 10 nm or less, and more preferably 9 nm or less. If it exceeds 10 nm, the surface properties of the magnetic layer is deteriorated, resulting in a noise increase, which adversely affects the electromagnetic conversion characteristics.

The surface roughness of the non-magnetic substrate is freely controlled according to the size and amount of the filler to be added to the non-magnetic substrate. Examples of the filler include oxides and carbonates of Ca, Si, Ti, Al, and the like, and in addition, organic resin fine powders of acryl series, and the like. Preferred are combinations of Al$_2$O$_3$ and organic resin fine powders.

Even if the center line mean roughness Ra on the side thereof to be provided with the magnetic layer is 10 nm or less, use of a filler with a mean particle size of larger than 0.3 micron in the base results in the formation of coarse protrusions on the magnetic layer, causing a deterioration in dropout, or the occurrence of a thermal noise.

Materials for such a non-magnetic substrate have no particular restriction, and may be selected from various flexible materials, and various rigid materials according to the object, and may assume a prescribed shape such as a tape shape, and dimensions in accordance with their respective standard. Examples of the flexible materials include various resins including polyesters such as polyethylene terephthalate(PET) and polyethylene naphthalate; polyolefins such as polypropylene; polyamide; polyimide; and polycarbonate.

Since the magnetic recording medium of the present invention uses very fine metal magnetic powder, dispersion and recoagulation of the magnetic powder when used as a magnetic coating material requires a caution. Excessive dispersion of an acicular magnetic powder causes breaking, resulting in deterioration in magnetic characteristics. In the present invention, it is preferable to use ceramic beads with a specific gravity of 4 or more, and more preferable to use zirconia beads with a specific gravity of about 6. The particle size thereof is 1 mm or less, and preferably 0.7 mm or less. By using such beads with a small particle size and a rather large specific gravity as a dispersion medium, the magnetic powder can be prevented from breaking, and dispersed into uniform primary particles. Further, when the thin magnetic film is applied as in the present invention, coating becomes difficult unless the magnetic powder content of the magnetic coating material is set to be as low as 15 wt % or less. However, such a dilute solution is susceptible to the occurrence of recoagulation of the magnetic powder. For this reason, it is effective that the magnetic coating material is rapidly applied after being subjected to ultrasonic dispersion as immediately as possible before coating.

Coating of the non-magnetic layer and the magnetic layer is accomplished by a wet-on-dry coating whereby the non-magnetic layer is applied, dried, and cured, and then the magnetic layer is applied thereon. By conducting the wet-on-dry coating, the nonuniform swelling at the interface between the non-magnetic layer and the magnetic layer is largely decreased, resulting in a magnetic recording medium with good surface properties and less variations in thickness of the magnetic layer. The applicable coating means which can be used herein may be known various means such as gravure coating, reverse-roll coating, die nozzle coating, and bar coating.

Below, the present invention will be specifically described by way of the following examples.

EXAMPLES AND COMPARATIVE EXAMPLES

1. Disk Sample
   (1) Example 1

| <Non-magnetic coating material 1> | |
|---|---|
| Granular α-Fe$_2$O$_3$ (FRO-3, manufactured by Sakai Chemical Industry Co., Ltd.) (Mean particle size = 30 nm, BET = 45 m$^2$/g) | 55 parts by weight |
| Carbon Black (#45B, manufactured by Mitsubishi Chemical Corp.) | 30 parts by weight |

-continued

| <Non-magnetic coating material 1> | |
|---|---|
| (Mean particle size = 24 nm, BET = 125 m$^2$/g, DBP oil absorption = 47 ml/100 g) | |
| α-Al$_2$O$_3$ | 15 parts by weight |
| (AKP50, manufactured by Sumitomo Chemical Industry Co., Ltd.) (Mean particle size = 0.20 μm, BET = 8 m$^2$/g) | |
| Electron beam curable vinyl chloride series copolymer | 12 parts by weight |
| (Polymerization degree = 300, polar group: —OSO$_3$K = 2/molecule) | |
| Electron beam curable polyurethane resin | 4 parts by weight |
| (Mn = 25000, polar group: phosphorus compound = 1/molecule) | |
| Trifunctional acryl monomer | 2 parts by weight |
| (PA505, manufactured by Sanyo Chemical Industries, Ltd.) | |
| Isocetyl stearate | 10 parts by weight |
| Butyl stearate | 4 parts by weight |
| MEK(Methylethylketone) | 126 parts by weight |
| Toluene | 38 parts by weight |
| Cyclohexanone | 38 parts by weight |

The above-described components were subjected to a kneading treatment, and then dispersed in a sand grinder mill to form a non-magnetic coating material 1.

| <Magnetic coating material 1> | |
|---|---|
| Metal magnetic powder | 100 parts by weight |
| (Hc = 158 kA/m, σ$_s$ = 120 Am$^2$/kg, BET = 48 m$^2$/g, PH = 10, mean major axis length = 0.07 μm, Fe/Co = 100/20 (weight ratio), Al and Y are contained as elements added) | |
| Vinyl chloride series copolymer | 14 parts by weight |
| (MR 110, manufactured by Nippon Zeon Co., Ltd.) (Polymerization degree = 300, polar group: —OSO$_3$K) | |
| —SO$_3$Na-containing polyurethane resin | 6 parts by weight |
| (Mn = 25000, polar group concentration = 1/molecule) | |
| Abrasive material α-Al$_2$O$_3$ | 10 parts by weight |
| (HIT82, manufactured by Sumitomo Chemical Industry Co., Ltd.) (Mean particle size = 0.12 μm, BET = 20 m$^2$/g) | |
| Carbon Black | 3 parts by weight |
| (CF-9, manufactured by Mitsubishi Chemical Corp.) (Mean particle size = 40 nm, BET = 60 m$^2$/g, DBP oil absorption = 64 ml/100 g) | |
| Sorbitan monostearate | 3 parts by weight |
| Isocetyl stearate | 3 parts by weight |
| Butyl stearate | 2 parts by weight |
| MEK | 380 parts by weight |
| Toluene | 130 parts by weight |
| Cyclohexanone | 130 parts by weight |

The above-described components were subjected to a kneading treatment, and then dispersed in a sand grinder mill to form a magnetic coating material 1.

First, the non-magnetic coating material 1 was applied on a 62-μm-thick PET film with a surface roughness (Ra) of 8 nm, which contains 500 ppm of SiO$_2$ particles with a mean particle size of 0.1 μm as a filler, by an extrusion type die nozzle system so that the dry thickness was 2.0 μm, and dried at a drying temperature of 100° C. Then, the dried film was subjected to a calender treatment under a linear pressure of 2940 N/cm and at a temperature of 90° C., and then irradiated with an electron beam (5 Mrad). Next, another side of the film was also formed by the same procedure to form a roll with non-magnetic layers on both sides.

Then, to the magnetic coating material 1, added was 4 parts by weight of Coronate L (manufactured by Nippon Polyurethane Kogyo K. K.). The resulting coating material was applied, while being redispersed in an ultrasonic dispersing machine, on the non-magnetic layer-coated roll by an extrusion type die nozzle system so that the dry thickness was 0.15 μm, and further subjected to a random-orientation treatment by a random-orienting magnet, followed by drying at a drying temperature of 100° C. Then, the dried film was subjected to a calender treatment under a linear pressure of 2940 N/cm and at a temperature of 90° C. to finish a coating film on one side thereof. Next, another side of the film was also formed by the same procedure to form a raw roll with magnetic layers on both sides.

Finally, the resulting raw roll was stamped into a disk form, and then the disk was heat cured under the conditions of 70° C. for 24 hours to form a disk sample.

(2) Example 2

A disk sample was formed in the same manner as in Example 1, except that the major axis length of the metal magnetic powder of the magnetic coating material 1 in Example 1 was changed into 0.05 μm.

(3) Example 3

A disk sample was formed in the same manner as in Example 1, except that the σ$_s$ of the metal magnetic powder of the magnetic coating material 1 in Example 1 was changed into 100 Am$^2$/kg.

(4) Example 4

A disk sample was formed in the same manner as in Example 1, except that the σ$_s$ of the metal magnetic powder of the magnetic coating material 1 in Example 1 was changed into 130 Am$^2$/kg.

(5) Example 5

| <Non-magnetic coating material 2> | |
|---|---|
| Granular α-Fe$_2$O$_3$ | 55 parts by weight |
| (FRO-3, manufactured by Sakai Chemical Industry Co., Ltd.) | |
| (Mean particle size = 30 nm, BET = 45 m$^2$/g) | |
| Carbon Black | 30 parts by weight |
| (#45B, manufactured by Mitsubishi Chemical Corp.) | |
| (Mean particle size = 24 nm, BET = 125 m$^2$/g, DBP oil absorption = 47 ml/100 g) | |
| α-Al$_2$O$_3$ | 15 parts by weight |
| (AKP50, manufactured by Sumitomo Chemical Industry Co., Ltd.) | |
| (Mean particle size = 0.20 μm, BET = 8 m$^2$/g) | |
| Vinyl chloride series copolymer | 12 parts by weight |
| (Polymerization degree = 300, polar group: —OSO$_3$K = 2/molecule) | |
| Polyurethane resin | 4 parts by weight |
| (Mn = 25000, polar group: phosphorus compound = 1/molecule) | |
| Isocetyl stearate | 10 parts by weight |
| Butyl stearate | 4 parts by weight |
| MEK | 126 parts by weight |
| Toluene | 38 parts by weight |
| Cyclohexanone | 38 parts by weight |

The above-described components were subjected to a kneading treatment, and then dispersed in a sand grinder mill to form a non-magnetic coating material 2.

First, a coating material obtained by adding 4 parts by weight of Coronate L(manufactured by Nippon Polyurethane Kogyo K. K.) to the non-magnetic coating material 2 was applied on a 62-μm-thick PET film with a surface roughness (Ra) of 8 nm, which contains 500 ppm of SiO$_2$ particles with a mean particle size of 0.1 μm as a filler, by an extrusion type die nozzle system so that the dry thickness was 2.0 μm, and dried at a drying temperature of 100° C. Then, the dried film was subjected to a calender treatment under a linear pressure of 2940 N/cm and at a temperature of 90° C. Next, another side of the film was also formed by the same procedure to form a roll with non-magnetic layers on both sides. Thereafter, the roll was heat cured under the conditions of 60° C. for 24 hours Then, to the magnetic coating material 1, added was 4 parts by weight of Coronate L (manufactured by Nippon Polyurethane Kogyo K. K.). The resulting coating material was applied, while being redispersed in an ultrasonic dispersing machine, on the non-magnetic layer-coated roll by an extrusion type die nozzle system so that the dry thickness was 0.15 μm, and further subjected to a random-orientation treatment by a random-orienting magnet, followed by drying at a drying temperature of 100° C. Then, the dried film was subjected to a calender treatment under a linear pressure of 2940 N/cm and at a temperature of 90° C. to finish a coating film on one side thereof. Next, another side of the film was also formed by the same procedure to form a raw roll with magnetic layers on both sides.

Finally, the resulting raw roll was stamped into a disk form, and then the disk was heat cured under the conditions of 70° C. for 24 hours to form a disk sample.

(6) Comparative Example 1

A disk sample was formed in the same manner as in Example 1, except that the σ$_s$ of the metal magnetic powder of the magnetic coating material 1 in Example 1 was changed into 150 Am$^2$/kg.

(7) Comparative Example 2

A disk sample was formed in the same manner as in Example 1, except that the σ$_s$ of the metal magnetic powder of the magnetic coating material 1 in Example 1 was changed into 85 Am$^2$/kg.

(8) Comparative Example 3

A disk sample was formed in the same manner as in Comparative Example 1, except that the major axis length of the metal magnetic powder of the magnetic coating material in Comparative Example 1 was changed into 0.05 μm.

(9) Comparative Example 4

A disk sample was formed in the same manner as in Example 1, except that the major axis length of the metal magnetic powder of the magnetic coating material 1 in Example 1 was changed into 0.12 μm.

(10) Comparative Example 5

A disk sample was formed in the same manner as in Example 1, except that the major axis length of the metal magnetic powder of the magnetic coating material 1 in Example 1 was changed into 0.02 μm.

(11) Comparative Example 6

To each of the non-magnetic coating material 2 and the magnetic coating material 1, added was 4 parts by weight of Coronate L (manufactured by Nippon Polyurethane Kogyo K. K.). First, the non-magnetic coating material 2 was applied onto a 62-μm-thick PET film with a surface roughness (Ra) of 8 nm, which contains 500 ppm of SiO$_2$ particles with a mean particle size of 0.1 μm as a filler, by an extrusion type die nozzle system so that the dry thickness was 2.0 μm. While it was still in the wet state, the magnetic coating material 1 was applied thereon, while being redispersed in an ultrasonic dispersing machine, by an extrusion type die nozzle system so that the dry thickness was 0.15 μm. Then, the resulting film was subjected to a random-orientation treatment by a random-orienting magnet, followed by drying at a drying temperature of 100° C. Then, the dried film was subjected to a calender treatment under a linear pressure of 2940 N/cm and at a temperature of 90° C. to finish a coating film on one side thereof. Next, another side of the film was also formed by the same procedure to form a raw roll with magnetic layers on both sides.

(12) Comparative Example 7

The non-magnetic coating material 1 was applied onto a 62-μm-thick PET film with a surface roughness (Ra) of 8 nm, which contains 500 ppm of SiO$_2$ particles with a mean particle size of 0.1 μm as a filler, by an extrusion type die nozzle system so that the dry thickness was 2.0 μm. While it was still in the wet state, to the magnetic coating material 1, added was 4 parts by weight of Coronate L (manufactured by Nippon Polyurethane Kogyo K. K.). Then, the resulting coating material was applied thereon, while being redispersed in an ultrasonic dispersing machine, by an extrusion type die nozzle system so that the dry thickness was 0.15 μm, and then subjected to a random-orientation treatment by a random-orienting magnet, followed by drying at a drying temperature of 100° C. Then, the dried film was subjected to a calender treatment under a linear pressure of 2940 N/cm and at a temperature of 90° C., and then irradiated with an electron beam (5 Mrad). Next, another side of the film was also formed by the same procedure to form a raw roll with magnetic layers on both sides.

Finally, the resulting raw roll was stamped into a disk form, and then the disk was heat cured under the conditions of 70° C. for 24 hours to form a disk sample.

(13) Comparative Example 8

A disk sample was formed in the same manner as in Example 5, except that the heat curing of the non-magnetic raw fabric in Example 5 was not carried out.

2. Tape Sample

(14) Example 6

| <Non-magnetic coating material 3> | |
|---|---|
| Granular $\alpha$-Fe$_2$O$_3$ | 75 parts by weight |
| (DPN-250BW, manufactured by Toda Kogyo Corp.) | |
| (Mean major axis length = 150 nm, BET = 55 m$^2$/g) | |
| Carbon Black | 20 parts by weight |
| (#950B, manufactured by Mitsubishi Chemical Corp.) | |
| (Mean particle size = 16 nm, BET = 250 m$^2$/g, DBP oil absorption = 80 ml/100 g) | |
| $\alpha$-Al$_2$O$_3$ | 5 parts by weight |
| (HIT60A, manufactured by Sumitomo Chemical Industry Co., Ltd.) | |
| (Mean particle size = 0.18 $\mu$m, BET = 12 m$^2$/g) | |
| Electron beam curable vinyl chloride series copolymer | 12 parts by weight |
| (Polymerization degree = 300, polar group: —OSO$_3$K) | |
| Electron beam curable polyurethane resin | 6 parts by weight |
| (Mn = 25000, polar group: phosphorus compound = 1/molecule) | |
| Butyl stearate | 1 part by weight |
| Stearic acid | 1 part by weight |
| MEK | 150 parts by weight |
| Toluene | 50 parts by weight |
| Cyclohexanone | 50 parts by weight |

The above-described components were subjected to a kneading treatment, and then dispersed in a sand grinder mill to form a non-magnetic coating material 3.

| <Magnetic coating material 2> | |
|---|---|
| Metal magnetic powder | 100 parts by weight |
| (Hc = 158 kA/m, $\sigma_s$ = 120 Am$^2$/kg, BET = 48 m$^2$/g, PH = 10, mean major axis length = 0.07 $\mu$m, | |
| Fe/Co = 100/20 (weight ratio), Al and Y are contained as elements added) | |
| Vinyl chloride series copolymer | 10 parts by weight |
| (Polymerization degree = 300, polar group: —OSO$_3$K) | |
| —SO$_3$Na-containing polyurethane resin | 7 parts by weight |
| (Mn = 25000, polar group concentration = 1/molecule) | |
| $\alpha$-Al$_2$O$_3$ | 12 parts by weight |
| (HIT82, manufactured by Sumitomo Chemical Industry Co., Ltd.) | |
| (Mean particle size = 0.12 $\mu$m, BET = 20 m$^2$/g) | |
| Myristic acid | 2 parts by weight |
| MEK | 250 parts by weight |
| Toluene | 80 parts by weight |
| Cyclohexanone | 80 parts by weight |

The above-described components were subjected to a kneading treatment, and then dispersed in a sand grinder mill to form a magnetic coating material 2.

| <Backcoat layer coating material> | |
|---|---|
| Carbon Black | 80 parts by weight |
| (Conductex SC, manufactured by Columbian Carbon Co., mean particle size = 20 nm, | |
| BET = 220 m$^2$/g) | |
| Carbon Black | 1 part by weight |
| (Sevacarb MT, manufactured by Columbian Carbon Co., mean particle size = 350 nm, | |
| BET = 8 m$^2$/g) | |
| $\alpha$-Fe$_2$O$_3$ | 1 part by weight |

-continued

| <Backcoat layer coating material> | |
|---|---|
| (TF100, manufactured by Toda Kogyo Corp., mean particle size = 0.1 μm) | |
| Vinyl chloride-vinyl acetate-vinyl alcohol copolymer | 65 parts by weight |
| (Monomer weight ratio = 92:3:5, mean polymerization degree = 420) | |
| Polyester polyurethane resin | 35 parts by weight |
| MEK | 260 parts by weight |
| Toluene | 260 parts by weight |
| Cyclohexanone | 260 parts by weight |

The above-described components were subjected to a kneading treatment, and then dispersed in a sand grinder mill.

Then, the following additives and solvents were added thereto to conduct viscosity adjustment.

| Stearic acid | 1 part by weight |
|---|---|
| Myristic acid | 1 part by weight |
| Butyl stearate | 2 parts by weight |
| MEK | 210 parts by weight |
| Toluene | 210 parts by weight |
| Cyclohexanone | 210 parts by weight |

Then, onto a 6.5-μm-thick PEN(polyetylen naphthalate) film with a surface roughness (Ra) of 6 nm, which contains 500 ppm of $SiO_2$ particles with a mean particle size of 0.1 μm as a filler, first, the non-magnetic layer coating material 3 was applied by an extrusion type die nozzle system so that the dry thickness was 2.0 μm, followed by drying at a drying temperature of 100° C. Then, the dried film was subjected to a calender treatment under a linear pressure of 2940 N/cm and at a temperature of 90° C., and then irradiated with an electron beam (5 Mrad) to form a non-magnetic layer-coated roll. Then, Coronate L (manufactured by Nippon Polyurethane Kogyo K. K.) was added in an amount of 4 parts by weight to the magnetic coating material 2, while it was added in an amount of 1 part by weight to every 100 parts by weight of the backcoat layer coating material. Then, the resulting magnetic coating material 2 was applied on the non-magnetic layer-coated roll by an extrusion type die nozzle system so that the dry thickness was 0.15 μm. The resulting film was subjected to an orientation treatment, followed by drying at a drying temperature of 100° C. Then, the dried film was subjected to a calender treatment under a linear pressure of 2940 N/cm and at a temperature of 100° C. Then, onto the base side of the film opposite to the magnetic layer, the resulting backcoat layer coating material was applied by an extrusion type die nozzle system so that the dry thickness was 0.5 μm to form a raw roll.

The resulting raw roll was allowed to stand at ordinary temperature for 24 hours, followed by curing for 24 hours in a 60° C. heating oven. Then cured film was cut into a width of 6.35 mm to obtain a tape sample.

(15) Example 7

A tape sample was formed in the same manner as in Example 6, except that the major axis length of the metal magnetic powder of the magnetic coating material 2 in Example 6 was changed into 0.05 μm.

(16) Example 8

A tape sample was formed in the same manner as in Example 6, except that the $\sigma_s$ of the metal magnetic powder of the magnetic coating material 2 in Example 6 was changed into 100 $Am^2$/kg.

(17) Example 9

A tape sample was formed in the same manner as in Example 6, except that the $\sigma_s$ of the metal magnetic powder of the magnetic coating material 2 in Example 6 was changed into 130 $Am^2$/kg.

(18) Example 10

| <Non-magnetic coating material 4> | |
|---|---|
| α-$Fe_2O_3$ | 75 parts by weight |
| (DPN-250BW, manufactured by Toda Kogyo Corp.) | |
| (Mean major axis length = 150 nm, BET = 55 $m^2$/g) | |
| Carbon Black | 20 parts by weight |
| (#950B, manufactured by Mitsubishi Chemical Corp.) | |
| (Mean particle size = 16 nm, BET = 250 $m^2$/g, DBP oil absorption = 80 ml/100 g) | |
| α-$Al_2O_3$ | 5 parts by weight |
| (HIT60A, manufactured by Sumitomo Chemical Industry Co., Ltd.) | |
| (Mean particle size = 0.18 μm, BET = 12 $m^2$/g) | |
| Vinyl chloride series copolymer | 12 parts by weight |
| (Polymerization degree = 300, polar group: —$OSO_3K$) | |
| Polyurethane resin | 6 parts by weight |
| (Mn = 25000, polar group: phosphorus compound = 1/molecule) | |
| Butyl stearate | 1 part by weight |
| Stearic acid | 1 part by weight |
| MEK | 150 parts by weight |
| Toluene | 50 parts by weight |
| Cyclohexanone | 50 parts by weight |

The above-described components were subjected to a kneading treatment, and then dispersed in a sand grinder mill to form a non-magnetic coating material 4.

Onto a 6.5-μm-thick PEN film with a surface roughness (Ra) of 6 nm, which contains 500 ppm of $SiO_2$ particles with a mean particle size of 0.1 μm as a filler, first, a coating material obtained by adding 4 parts by weight of Coronate L (manufactured by Nippon Polyurethane Kogyo K. K.) to the non-magnetic coating material 4 was applied by an extrusion type die nozzle system so that the dry thickness was 2.0 μm, followed by drying at a drying temperature of 100° C. Then, the dried film was subjected to a calender treatment under a linear pressure of 2940 N/cm and at a temperature of 90° C. Thereafter, the film was heat cured under the conditions of 60° C. and for 24 hours to form a non-magnetic layer-coated roll.

Then, Coronate L (manufactured by Nippon Polyurethane Kogyo K. K.) was added in an amount of 4 parts by weight to the magnetic coating material 2, while it was added in an amount of 1 part by weight to every 100 parts by weight of the backcoat layer coating material. Then, the resulting magnetic coating material 2 was applied on the non-magnetic layer-coated roll by an extrusion type die nozzle system so that the dry thickness was 0.15 μm. The resulting film was subjected to an orientation treatment, followed by drying at a drying temperature of 100° C. Then, the dried film was subjected to a calender treatment under a linear pressure of 2940 N/cm and at a temperature of 100° C. Next, onto the base side of the film opposite the magnetic layer, the resulting backcoat layer coating material was applied by an extrusion type die nozzle system so that the dry thickness was 0.5 μm to form a raw roll.

The resulting raw roll was allowed to stand at ordinary temperature for 24 hours, followed by curing for 24 hours in a 60° C. heating oven. Then cured film was cut into a width of 6.35 mm to obtain a tape sample.

(19) Comparative Example 9

A tape sample was formed in the same manner as in Example 6, except that the $\sigma_s$ of the metal magnetic powder of the magnetic coating material 2 in Example 6 was changed into 150 $Am^2/kg$.

(20) Comparative Example 10

A tape sample was formed in the same manner as in Example 6, except that the $\sigma_s$ of the metal magnetic powder of the magnetic coating material 2 in Example 6 was changed into 85 $Am^2/kg$.

(21) Comparative Example 11

A tape sample was formed in the same manner as in Comparative Example 8, except that the major axis length of the metal magnetic powder of the magnetic coating material in Comparative Example 8 was changed into 0.05 μm.

(22) Comparative Example 12

A tape sample was formed in the same manner as in Example 6, except that the major axis length of the metal magnetic powder of the magnetic coating material in Example 6 was changed into 0.12 μm.

(23) Comparative Example 13

A tape sample was formed in the same manner as in Example 6, except that the major axis length of the metal magnetic powder of the magnetic coating material in Example 6 was changed into 0.02 μm.

(24) Comparative Example 14

Coronate L (manufactured by Nippon Polyurethane Kogyo K. K.) was added in an amount of 4 parts by weight to each of the non-magnetic coating material 4 and the magnetic coating material 2, and in an amount of 1 part by weight to every 100 parts by weight of the backcoat layer coating material. First, the non-magnetic coating material 4 was applied onto a 6.5-μm-thick PEN film with a surface roughness (Ra) of 6 nm, which contains 500 ppm of $SiO_2$ particles with a mean particle size of 0.1 μm as a filler, by an extrusion type die nozzle system so that the dry thickness was 2.0 μm. While it was still in the wet state, the magnetic coating material 2 was applied thereon, while being redispersed in an ultrasonic dispersing machine, by an extrusion type die nozzle system so that the dry thickness was 0.15 μm. Thereafter, the resulting film was subjected to an orientation treatment, followed by drying at a drying temperature of 100° C. Then, the dried film was subjected to a calender treatment under a linear pressure of 2940 N/cm and at a temperature of 100° C. Next, onto the base side of the film opposite the magnetic layer, the backcoat layer coating material was applied by an extrusion type die nozzle system so that the dry thickness was 0.5 μm to form a raw roll.

The resulting raw roll was allowed to stand at ordinary temperature for 24 hours, followed by curing for 24 hours in a 60° C. heating oven. Then cured film was cut into a width of 6.35 mm to obtain a tape sample.

(25) Comparative Example 15

Coronate L (manufactured by Nippon Polyurethane Kogyo K. K.) was added in an amount of 4 parts by weight to the magnetic coating material 2 and in an amount of 1 part by weight of 100 parts by weight of the backcoat layer coating material. The non-magnetic coating material 3 was applied onto a 6.5-μm-thick PEN film with a surface roughness (Ra) of 6 nm, which contains 500 ppm of $SiO_2$ particles with a mean particle size of 0.1 μm as a filler, by an extrusion type die nozzle system so that the dry thickness was 2.0 μm. While it was still in the wet state, the magnetic coating material 2 was applied thereon, while being redispersed in an ultrasonic dispersing machine, by an extrusion type die nozzle system so that the dry thickness was 0.15 μm. Thereafter, the resulting film was subjected to an orientation treatment, followed by drying at a drying temperature of 100° C. Then, the dried film was subjected to a calender treatment under a linear pressure of 2940 N/cm and at a temperature of 100° C., and irradiated with an electron beam (5 Mrad). Next, onto the base side of the film opposite the magnetic layer, the backcoat layer coating material was applied by an extrusion type die nozzle system so that the dry thickness was 0.5 μm to form a raw roll.

The resulting raw roll was allowed to stand at ordinary temperature for 24 hours, followed by curing for 24 hours in a 60° C. heating oven. Then cured film was cut into a width of 6.35 mm to obtain a tape sample.

(26) Comparative Example 16

A tape sample was formed in the same manner as in Example 10, except that the heat curing of the non-magnetic raw fabric in Example 10 was not carried out.

The samples described above were evaluated for their respective surface properties and electromagnetic conversion characteristics. The results are shown in Tables 1 to 6.

<Evaluation Method>

(1) Center Line Surface Roughness Ra

The measurement was carried out under the condition of a filter of 0.18 to 9 Hz, a special stylus of 0.1×2.5 μm, a stylus pressure of 2 mg, a scan speed of 0.03 mm/sec, and a scan length of 500 μm by using a TALYSTEP system manufactured by Taylor Hobson K. K.

(2) Electromagnetic Conversion Characteristics (S/N Ratio)

1. Disk Sample

A laboratory MR head (the writing side: MIG head, a gap length of 0.15 μm, the reproducing side: Ni—Fe element MR head) manufactured by TDK was mounted on a spin stand to carry out the measurement.

2. Tape Sample

A laboratory MR head (recording head: MIG head, a gap length 1.0 μm, reproduction head: Ni—Fe element MR head) manufactured by TDK was mounted on a tester obtained by modifying a commercially available data drive so as to enable the input and output of a signal from a head to carry out the measurement. The electromagnetic conversion characteristics (S/N ratios) were determined by the foregoing methods, and the samples each with a S/N ratio of 20 dB or more were judged as to be acceptable.

TABLE 1

|  |  | Example 1 | Example 2 | Example 3 | Example 4 | Example 5 |
|---|---|---|---|---|---|---|
| Magnetic powder | $\sigma_s$(Am²/kg) | 120 | 120 | 105 | 130 | 120 |
|  | Major axis length (μm) | 0.07 | 0.05 | 0.07 | 0.07 | 0.07 |
| Non-magnetic layer resin species |  | EB | EB | EB | EB | NK |
| Curing step (included/excluded) |  | Included | Included | Included | Included | Included |
| Coating method |  | W/D | W/D | W/D | W/D | W/D |
| Surface roughness (nm) |  | 3.7 | 3.5 | 3.6 | 3.9 | 4.6 |
| S/N (dB) |  | 24 | 26 | 26 | 23 | 21 |

Notes)
EB and NK in the row of Non-magnetic layer resin species denote an electron beam-curable resin and a thermosetting resin, respectively.

Coating Method

W/W (wet-on-wet coating): a method in which a magnetic coating material is applied while a non-magnetic layer is still in a wet state.

W/O (wet-on-dry coating): a method in which a magnetic layer is applied after coating and drying a non-magnetic layer.

TABLE 2

|  |  | Comparative example 1 | Comparative example 2 | Comparative example 3 | Comparative example 4 | Comparative example 5 |
|---|---|---|---|---|---|---|
| Magnetic powder | $\sigma_s$(Am²/kg) | 150 | 80 | 150 | 120 | 120 |
|  | Major axis length (μm) | 0.07 | 0.07 | 0.05 | 0.12 | 0.02 |
| Non-magnetic layer resin species |  | EB | EB | EB | EB | EB |
| Curing step (included/excluded) |  | Included | Included | Included | Included | Included |
| Coating method |  | W/D | W/D | W/D | W/D | W/D |
| Surface roughness (nm) |  | 4.3 | 3.8 | 4.0 | 4.4 | 5.5 |
| S/N (dB) |  | 18 | 19 | 17 | 18 | 15 |

TABLE 3

|  |  | Comparative example 6 | Comparative example 7 | Comparative example 8 |
|---|---|---|---|---|
| Magnetic powder | $\sigma_s$(Am²/kg) | 120 | 120 | 120 |
|  | Major axis length (μm) | 0.07 | 0.07 | 0.07 |
| Non-magnetic layer resin species |  | NK | EB | NK |
| Curing step (included/excluded) |  | Included | Included | Excluded |
| Coating method |  | W/W | W/W | W/D |
| Surface roughness (nm) |  | 5.2 | 5.1 | 7.0 |
| S/N (dB) |  | 16 | 17 | 13 |

TABLE 4

|  |  | Example 6 | Example 7 | Example 8 | Example 9 | Example 10 |
|---|---|---|---|---|---|---|
| Magnetic powder | $\sigma_s$(Am²/kg) | 120 | 120 | 105 | 130 | 120 |
|  | Major axis length (μm) | 0.07 | 0.05 | 0.07 | 0.07 | 0.07 |
| Non-magnetic layer resin species |  | EB | EB + NK | EB | EB | NK |
| Curing step (included/excluded) |  | Included | Included | Included | Included | Included |
| Coating method |  | W/D | W/D | W/D | W/D | W/D |

TABLE 4-continued

|  | Example 6 | Example 7 | Example 8 | Example 9 | Example 10 |
|---|---|---|---|---|---|
| Surface roughness (nm) | 3.8 | 3.4 | 3.7 | 3.9 | 4.8 |
| S/N (dB) | 23 | 24 | 25 | 23 | 20 |

TABLE 5

| | | Comparative example 9 | Comparative example 10 | Comparative example 11 | Comparative example 12 | Comparative example 13 |
|---|---|---|---|---|---|---|
| Magnetic powder | $\sigma_s(Am^2/kg)$ | 150 | 80 | 150 | 120 | 120 |
| | Major axis length ($\mu$m) | 0.07 | 0.07 | 0.05 | 0.12 | 0.02 |
| Non-magnetic layer resin species | | EB | EB | EB | EB | EB |
| Curing step (included/excluded) | | Included | Included | Included | Included | Included |
| Coating method | | W/D | W/D | W/D | W/D | W/D |
| Surface roughness (nm) | | 4.4 | 4.1 | 4.3 | 4.1 | 5.5 |
| S/N (dB) | | 18 | 17 | 18 | 17 | 15 |

TABLE 6

| | | Comparative example 14 | Comparative example 15 | Comparative example 16 |
|---|---|---|---|---|
| Magnetic powder | $\sigma_s(Am^2/kg)$ | 120 | 120 | 120 |
| | Major axis length ($\mu$m) | 0.07 | 0.07 | 0.07 |
| Non-magnetic layer resin species | | NK | EB | NK |
| Curing step (included/excluded) | | Included | Included | Excluded |
| Coating method | | W/W | W/W | W/D |
| Surface roughness (nm) | | 5.4 | 5.3 | 6.6 |
| S/N (dB) | | 17 | 18 | 13 |

According to the present invention, a magnetic recording medium excellent in electromagnetic conversion characteristics, and suitable for reproduction with an MR head can be obtained by applying a magnetic layer using a metal magnetic powder with a mean major axis length of from 0.03 to 0.08 $\mu$m, and a $\sigma_s$ of from 100 to 130 Am$^2$, and having a center line mean roughness of 5 $\mu$m or less on a non-magnetic layer by a wet-on-dry method.

What is claimed is:

1. A magnetic recording medium, comprising:
   a non-magnetic substrate;
   a non-magnetic layer including a binder resin, in which a non-magnetic powder is dispersed, on the non-magnetic substrate; and
   a magnetic layer on the non-magnetic layer,
   wherein the magnetic layer has a thickness of at most 0.15 nm and is obtained by applying a magnetic coating material on the applied, non-magnetic layer,
   the magnetic layer comprises a metal magnetic powder with a mean major axis length of from 0.03 to 0.08 $\mu$m, and a saturation magnetization $\sigma_s$ of from 100 to 130 Am$^2$/kg, an X-ray crystal particle size Dx of from 50 to 150 Å, and the center line mean roughness Ra of the magnetic layer surface is 5 nm or less,
   the non-magnetic substrate comprises a filler and the particle size of the filler contained is 0.3 $\mu$m or less.

2. The magnetic recording medium according to claim 1, wherein the binder resin contained in the non-magnetic layer is an electron beam-curable resin.

3. The magnetic recording medium according to claim 2, wherein the non-magnetic powder comprises at least carbon black.

4. The magnetic recording medium according to claim 1, wherein the non-magnetic powder comprises at least carbon black.

5. The magnetic recording medium according to claim 1, wherein the center line mean roughness Ra of the non-magnetic substrate is 10 nm or less.

6. The magnetic recording medium according to claim 1, wherein the magnetic layer contains an abrasive material, and the relationship of $0.5 \times T \leq D \leq 1.5 \times T$ is satisfied where the average particle size of the abrasive material is D, and the thickness of the magnetic layer is T.

7. The magnetic recording reproduction system for recording onto a magnetic record medium and reproducing with a MR head, the magnetic recording medium comprising:
   a non-magnetic substrate;
   a non-magnetic layer including a binder resin, in which a non-magnetic powder is dispersed, on at least one side of the non-magnetic substrate; and
   a magnetic layer havin a thickness of at most 0.15 $\mu$m and on the non-magnetic layer,
   wherein the magnetic layer comprises a metal magnetic powder with a mean major axis length of from 0.03 to 0.08 $\mu$m, and a saturation magnetization $\sigma_s$ of from 100 to 130 Am$^2$/kg, an X-ray crystal particle size Dx of from 50 to 150 Å, and the center line mean roughness Ra of the magnetic layer surface is 5 nm or less.

* * * * *